United States Patent [19]

Shibuya

[11] Patent Number: 5,086,222

[45] Date of Patent: Feb. 4, 1992

[54] SCANNING TYPE MICROSCOPE WITH PHASE MEMBER

[75] Inventor: Masato Shibuya, Kawasaki, Japan

[73] Assignee: Nikon Corporation, Tokyo, Japan

[21] Appl. No.: 646,461

[22] Filed: Jan. 25, 1991

Related U.S. Application Data

[63] Continuation of Ser. No. 410,658, Sep. 21, 1989, abandoned.

[30] Foreign Application Priority Data

Sep. 26, 1988 [JP] Japan ................... 63-240182

[51] Int. Cl.⁵ .................... H01J 3/14; G02B 21/06
[52] U.S. Cl. ..................... 250/234; 359/370
[58] Field of Search ............ 356/432, 345, 349, 354, 356/356; 350/507, 509; 250/201.3, 550, 201.9, 234

[56] References Cited

U.S. PATENT DOCUMENTS

| | | | |
|---|---|---|---|
| 2,655,077 | 10/1953 | Bennett | 350/509 |
| 2,699,092 | 1/1955 | Räntsch | 350/509 |
| 4,407,569 | 10/1983 | Piller et al. | 350/509 |
| 4,744,660 | 5/1988 | Noguchi et al. | 350/509 |
| 4,800,269 | 1/1989 | Horikawa | 250/234 |
| 4,845,352 | 7/1989 | Benschoy | 250/201.3 |
| 4,953,188 | 8/1990 | Siegel et al. | 350/509 |

OTHER PUBLICATIONS

"Laser Scan Microscope" Carl Zeiss publication W41-910e, 1984, (West Germany).
Wijnaendts et al., "Optical Fluorescence Microscopy in Three-Dimensions: Microtomoscopy", *Journal of Microscopy*, vol. 138, pt. 1, 4/85, pp. 29-34.
Wilson et al., *Theory and Practice of Scanning Optical Microscopy*, Academic Press 1984, pp. 79-93, 100-110.

*Primary Examiner*—David C. Nelms
*Assistant Examiner*—Michael Messinger
*Attorney, Agent, or Firm*—Shapiro and Shapiro

[57] ABSTRACT

A scanning type microscope includes a coherent light source, a condenser for condensing rays of light supplied from the coherent light source on an object, and a phase member disposed between the coherent light source and the condenser, the phase member having first and second phase areas to provide a desired phase difference on the wave front of the rays of light reaching the object. The microscope further includes an objective for guiding the rays of light coming from the object, a photodetector arrangement which separately detects light from a first of two optical path areas respectively corresponding to the first phase area of the phase member and the second phase area of the phase member, and a scanning arrangement for relatively moving the object and the position at which the rays of light are condensed by the condenser. A phase pattern on the object diffracts light from the second phase area into the optical path area corresponding to the first phase area. The diffracted light interferes with light from the first phase area, thus enabling detection of the phase pattern by contrast.

25 Claims, 7 Drawing Sheets

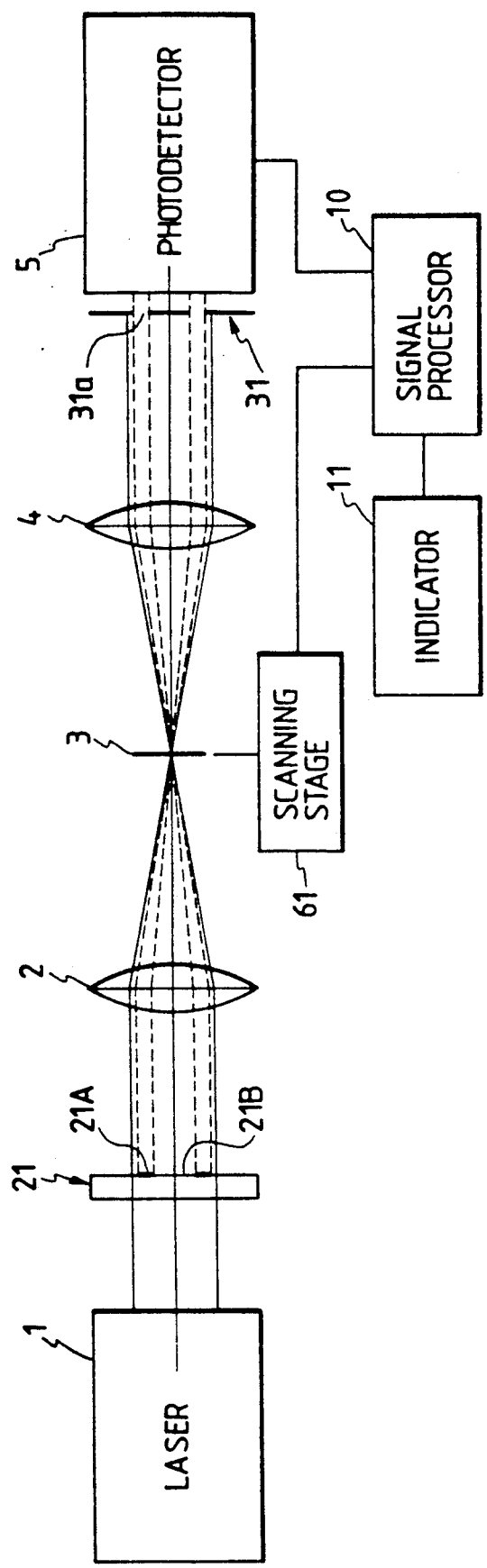
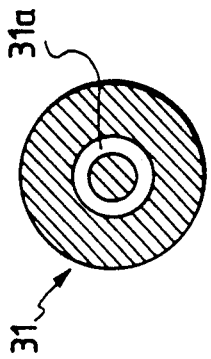
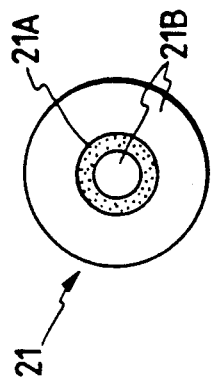

SCANNING TYPE MICROSCOPE WITH PHASE MEMBER

This is a continuation of application Ser. No. 410,658 filed Sept. 21, 1989, now abandoned.

BACKGROUND OF THE INVENTION

1. Field of the Invention

The present invention relates to a scanning type microscope, and more particularly, to a scanning type microscope which is capable of recognizing a phase object.

2. Related Background Art

Various types of scanning type microscopes have been made commercially available because of their advantages, including the ease with which an electric signal is processed to obtain a plane image at a high resolution and the relatively simple structure of their optical system resulting from the correction of axial aberration.

Despite such advantages, the conventional scanning type microscope is not suitable for observing an object having a colorless, transparent phase structure. This limitation will be explained in detail in connection with FIGS. 1A and 1B, which exemplify a conventional; scanning type microscope.

In FIG. 1A, which illustrates the basic structure of a conventional scanning type microscope, a bundle of rays emitted from a laser 1 is condensed by a condenser 2 on an object 3, and the light coming from the object 3 passes through an objective 4 which guides the light to a photodetector 5 where its intensity is detected. The object 3 and the position on the object 3 at which the bundle of rays is condensed by the condenser 2 are moved relative to each other by a scanner 6. When the object 3 has a pattern with different transmittances, this scanning causes changes in the intensity of light received by the photodetector 5. The optical informtion obtained by the photodetector 5 is stored in the order of input in a signal processor 10, and the data stored is displayed on an indicator 11 such as a CRT as a plane object pattern image utilizing contrast or color tone difference.

In a case where a fine phase pattern having a slight phase difference exists on the object 3, there is no substantial difference in the intensity of light detected, and such a phase pattern therefore cannot be detected. FIG. 1B is a vector diagram for the light received by the photodetector, expressed on a complex plane using the amplitude and the phase. As shown in FIG. 1B the fine phase pattern retards the phase of light A1 by a very small angle $\theta$, relative to the phase of light A2. This is a very small phase shift, and there is substantially no difference in the intensity between the lights A1 and A2. As a result, the phase shift information generated by the phase pattern and corresponding to vector a cannot be detected.

SUMMARY OF THE INVENTION

Accordingly, an object of the present invention is to provide a scanning type microscope which is capable of clearly recognizing a fine object having a slight phase difference.

Various features and advantages of the present invention will become apparent from the following description, reference being had to the accompanying drawings wherein the same reference numerals are used to denote the same parts or elements throughout.

BRIEF DESCRIPTION OF THE DRAWINGS

FIG. 5A is a schematic view of a first preferred embodiment of the present invention;

FIG. 5B is a plan view of a phase plate;

FIG. 5C is a plan view of a light blocking plate;

DETAILED DESCRIPTION OF THE INVENTION

Figure 1A:
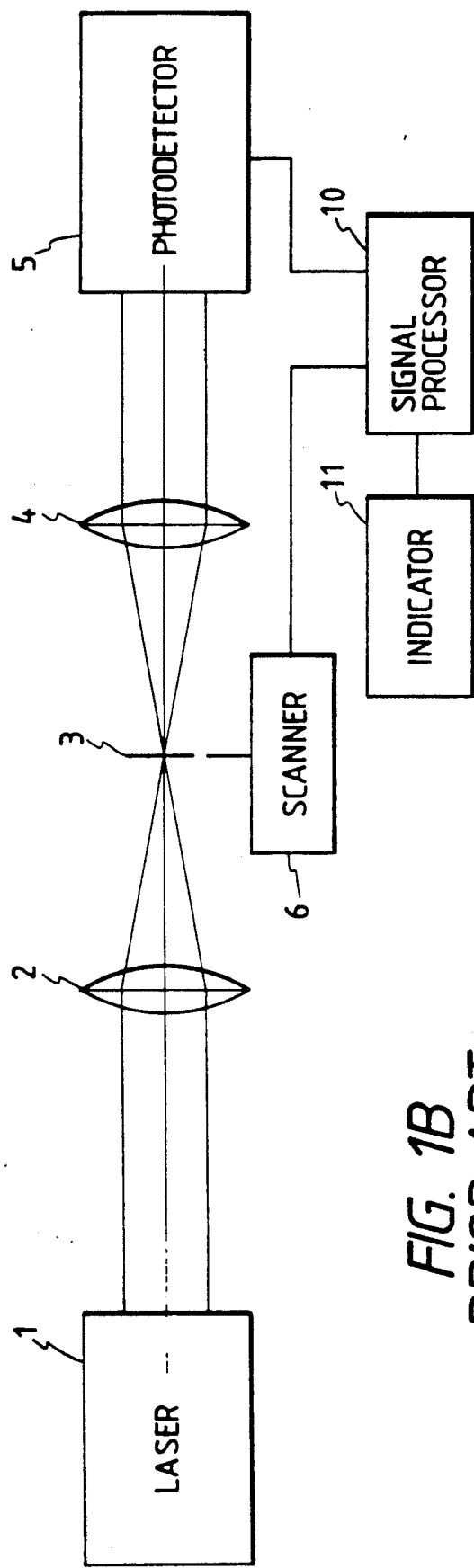
FIGS. 1A and 1B have already been referred to in the foregoing description, FIG. 1A being a schematic view of a conventional scanning type microscope, and FIG. 1B showing a light detected by the conventional microscope after passage through a phase pattern.
Figure 1B:
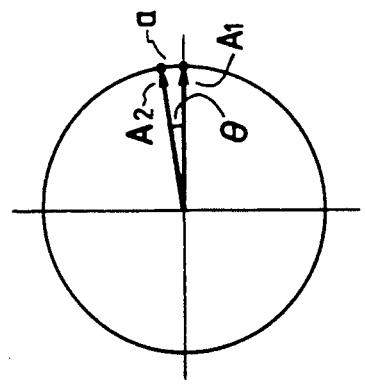
Figure 2:
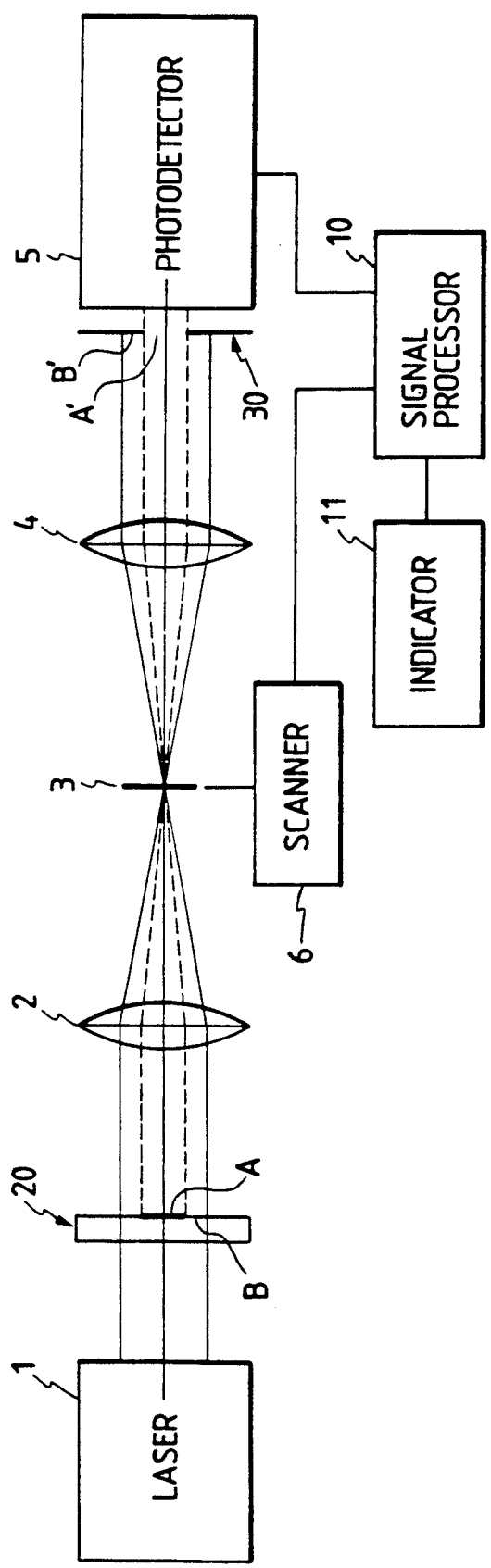
FIG. 2 is a schematic view of a scanning type microscope according to the present invention, illustrating the basic structure thereof.

FIG. 2 is a schematic view of a scanning type microscope according to the present invention, illustrating the basic structure thereof. In FIG. 2, a microscope includes a coherent light source (laser) 1, a condenser 2 for condensing the bundle of rays supplied from the coherent light source 1 on an object 3. A phase member 20 is disposed between the coherent light source 1 and the condenser 2 for forming first and second phase areas A and B which provide a desired phase difference on the wave surface of the bundle of rays reaching the object 3. An objective 4 guides the bundle of rays coming from the object 3 to a detector arrangement including a blocking member 30 (to be described in more detail shortly) and a photodetector 5. The microscope further includes a scanner 6, for relatively moving the object 3 and the position on the object 3 at which the light is condensed by the condenser 2. A signal from the photodetector 5 is stored in a signal processor 10 in synchronism with the scanning of the object by the scanner 6, and the signal stored in the signal processor 10 is displayed by an indicator 11 as a two-dimensional image representing the phase pattern on the object 3.

In a preferred mode of the invention, the phase member 20 may have a first phase area A in which the phase of the light passing through the phase member is advanced by $\frac{1}{4}$ of the wavelength (i.e., by 90°), and a second phase area B in which no phase shift occurs.

The light blocking member 30 disposed between the objective 4 and the photodetector 5 is designed to block an optical path area corresponding to either the first phase area A or the second phase area B of the phase member 20. In the present example, the light blocking member 30 has an open area A' corresponding to phase area A and to a first optical path area in which undisturbed rays of light from phase area A travel, and a blocking portion B' corresponding to phase area B and to a second optical path area in which undisturbed rays of light from phase area B travel. The blocking portion B' blocks light rays in the second path area, and open area A' passes light rays in the first path area to the photodetector 5.

With the above-described arrangement, when a fine phase pattern is present on the object 3, light from each phase area A and B is retarded in phase and diffracted by the phase pattern so as to be incident upon the optical path area corresponding to the other phase area. The diffracted light and undisturbed light in the other optical path area interfere with each other, whereby detection of contrast representative of the phase information on the phase pattern is enabled. In the illustrative structure of FIG. 2, light from phase area B is diffracted by the phase pattern on object 3 into the optical path area corresponding to phase area A and then passes through the open area A' together with undisturbed light from phase area A to the photodetector 5.

FIGS. 3 and 4 illustrate the principles of the invention in more detail.

Figure 3A:
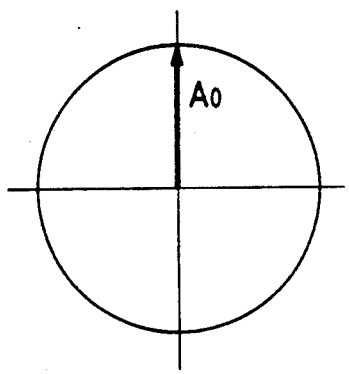
FIGS. 3A and 3B respectively show the light not disturbed by the phase pattern on an object.
Figure 3B:
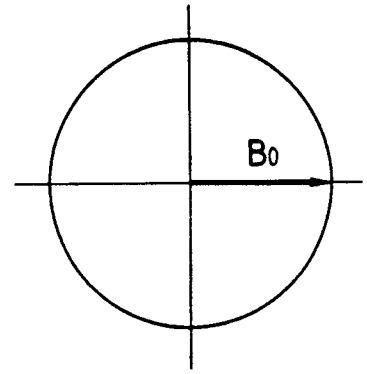

In a case where no phase pattern exists on the object 3, only rays of light A0 coming from the first phase area A reach the open area A' (the first optical path area corresponding to the first phase area A) of the light blocking member 30, as indicated in FIG. 3A. Only rays of light B0 coming from the second phase area B reach the blocked area B' (the second optical path area corresponding to the second phase area B) of the light blocking member 30, as indicated in FIG. 3B. The rays of light A0 coming from the first phase area A are advanced in phase by 90 degrees with respect to the rays of light B0 coming from the second phase area B.

Figure 4A:
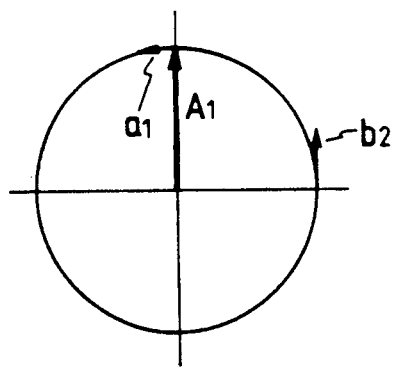
FIGS. 4A and 4B respectively show light detected when a fine phase pattern exists on the object.

In a case where a fine phase pattern exists on the object 3, the open area A' (the first optical path area corresponding to the first phase area A) of the light blocking member 30 receives, in addition to rays of light A1 coming from the first phase area A, the sum of rays of light a1 from the first phase area A which are retarded in phase and diffracted by the fine phase pattern and rays of light b2 from the second phase area B which are retarded in phase and diffracted by the fine phase pattern. Since the rays of light a1 and the rays of light A1 are out of phase by 90 degrees, they do not interfere with each other. The rays of light A1 and the rays of light b2 have the same phase, and therefore interfere with each other. Thus, the resulting rays of light are detected by the photodetector 5 as light substantially having a composite amplitude represented by (A1+b2). This means that the amplitude of the light coming from the spot where the fine phase pattern exists is larger than the amplitude of the light A1 coming from a spot where no fine phase pattern exists. The signal processor 10 detects the fine phase pattern as light having an intensity of $(A1+b2)^2$ in a visual field having a background intensity of $(A1)^2$. When the phase of the light is shifted by the fine phase pattern in the positive direction, as shown in FIG. 4A, the fine phase pattern is recognized as a light spot in the visual field. If it is in the negative direction, the fine phase pattern is recognized as a dark spot. In other words, dark or light spots are generated in accordance with the phase information on the fine phase pattern. It is to be noted that the intensity of the rays of light b2 obtained by diffracting the light coming from the second phase area is larger than that of the rays of light a1 obtained by diffracting the light coming from the first phase area, because the second phase area B provided by the phase member 20 is larger than the first phase area A and the intensity of the light coming from the second phase area is therefore larger than that of the light coming from the first phase area.

When the intensity of rays of light A1 and that of the rays of light b2 are the same or nearly the same, interference effects intensify and clearer contrasts caused by the phase pattern can be thus provided. This may be achieved by reducing the transmittance of the phase area provided by the phase member 20 which corresponds to the open area of the light blocking member 30. Also the signal processor 10 may be designed to provide inhanced contrast of the indicator 11 by damping the d.c. component of the signal representing the visual field.

Figure 4B:
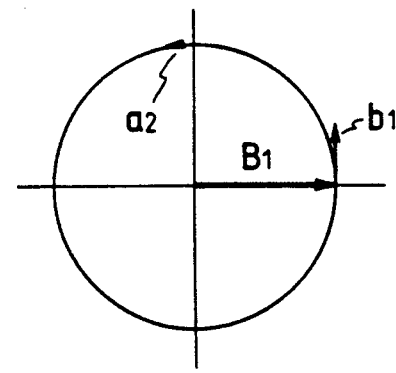

Referring to FIG. 4B, the light blocked area B' of the light blocking member 30 receives, in addition to the rays of light B1 coming from the second phase area B, the sum of rays of light b1 coming from the second phase area B which are retarded in phase and diffracted by the fine phase pattern and rays of light a2 coming from the first phase area A which are retarded in phase and diffracted by the fine phase pattern. The rays of light b1 and the rays of light B1 are out of phase by by 90 degrees, and therefore do not interfere with each other. The rays of light B1 and the rays of light a2 are in phase with each other and therefore interfere with each other. Thus, it will be appreciated that the fine phase pattern can be observed by blocking the optical path area A' corresponding to the first phase area A and by opening the area B' corresponding to the second phase area B, conversely to the structure shown in FIG. 2. In such an alternative arrangement the fine phase pattern can be observed as a spot having an intensity represented by $(B1-a2)^2$ in a visual field having a background intensity of $(B1)^2$. In that case, if the phase of the light is shifted by the fine phase pattern in the positive direction, the fine phase pattern is observed as a dark spot in the visual field. If it is in the negative direction, the fine phase pattern is observed as a light spot, conversely to the case shown in FIG. 4A.

Although detection of the phase pattern in either of the states shown in FIG. 4A and FIG. 4B is possible, blocking of the optical path area corresponding to the wider area of the two phase areas of the pahse member 20 ensures reception of a larger amount of diffracted light and, hence, clearer contrast.

As an alternative to the above-discussed forms in which light from only one optical path is supplied to the photodetector 5, it is of course possible to design the photodetector 5 to separately receive light from both optical paths. In such case, the image representing the fine phase pattern on the object 3 can be obtained as a lighter or darker spot relative to its background. Brightness and darkness may be easily reversed on the indicator 11 by the signal processor.

In the structure arranged in the manner described above, in a case where the magnitude of the first phase area A provided by the phase member 20 in the structure shown in FIG. 2 is substantially as small as the wavelength, the phase member 20 has to be made conjugate to the light blocking member 30. However, when the magnitude of the phase shift area of the phase member 20 is sufficiently large compared with the wavelength, it is not necessary for the phase member 20 and the light blocking member 30 to have a conjugate relation in a practical apparatus.

Next, a first preferred embodiment of the present invention will be described with reference to FIG. 5A.

A laser 1 which serves as a coherent light source includes a beam expander for changing the diameter of a laser beam to predetermined value. A bundle of rays emitted from the laser 1 is partially subjected to a phase shift by a phase plate 21, and the resultant rays of light are condensed on the object 3 by the condenser 2. The rays of light coming from the object 3 are condensed by the objective 4, and the resultant rays of light pass through an opening 31a of a light blocking plate 31 and reach the photodetector 5. The photodetector 5 outputs a signal representing the intensity of the light received, and the signal output is stored in the signal processor 10 so that it can be displayed on the indicator 11 to indicate the phase information of the object 3 in a desired form. The phase plate 21 has a ring-shaped first phase area 21A and a complementary second phase area 21B, as shown in FIG. 5B. The first phase area 21A is advanced in phase by one quarter of the wavelength with respect to the second phase area 21B. The light blocking plate 31 has the ring-shaped opening 31a which corresponds to the ring-shaped first phase area 21A of the phase plate 21. It blocks the light from reaching the photodetector other than through the opening 31a.

The phase information on the fine phase pattern in detected as variation in the intensity of light using the rays of light coming from the object 3 and received by the photodetector 5, as earlier explained in connection with FIG. 4A. The fine phase pattern can be detected and displayed as a contrast image by moving the object 3 with respect to the laser beam using a scanning stage 61. In this embodiment, the first phase area of the phase plate 21 has a ring-like shape, and this enables the rays of light diffracted by the fine phase pattern to be detected most effectively. It also enables a fine phase pattern having a short period to be detected more clearly. Also in this embodiment, the first phase area 21A and the second phase area 21B are out of phase by one fourth of the wavelength, i.e., by 90 degrees. However, the phase of the first phase area 21A and the second phase area 21B may differ by other angles depending on the object and the illumination. The width of the ring of the first phase area 21A can be set to any adequate value.

Figure 6:
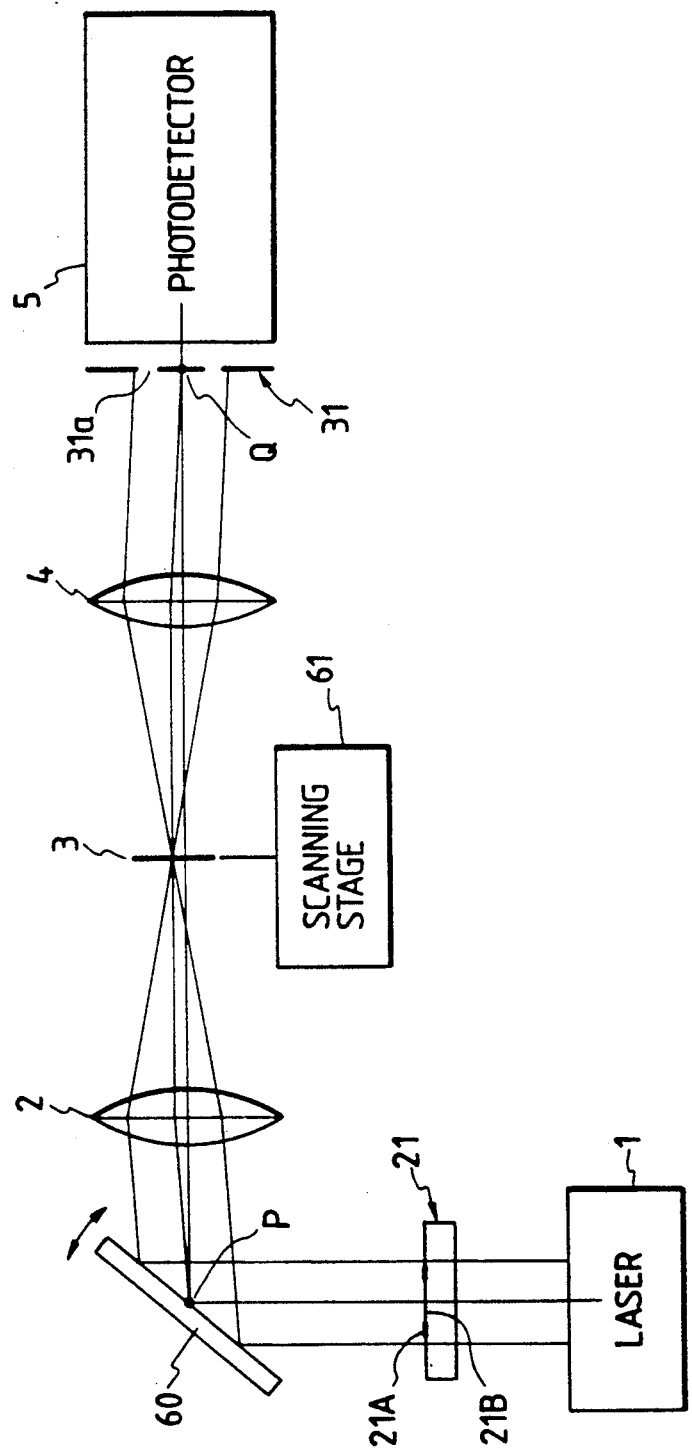
FIG. 6 is a schematic view of a second preferred embodiment of the present invention.

A second preferred embodiment of the present invention will be described below with reference to FIG. 6. In this structure, a scanning mirror 60 is disposed between the phase plate 21 and the condenser 2 in such a manner that the angle thereof can be changed so as to relatively move the object and the laser beam. The spot of the laser beam can be moved along the surface of the object 3 by changing the angle of the scanning mirror 60 and thereby changing the angle at which the parallel rays of light from the laser 1 are incident on the condenser 2. The origin P of deflection of the rays of light reflected by the scanning mirror 60 is located at the front focal point of the condenser 2. The object 3 is at the rear focal plane of the condenser 2 and at the front focal plane of the objective 4. The center Q of the light blocking plate 21 is on the rear focal plane of the objective 4.

In this embodiment, the fine phase pattern on the object 3 can be detected as variation in the intensity of light. A two-dimensional image of the object can be readily obtained by two-dimensionally moving the bundle of rays along the surface of the object 3 with the scanning mirror 60 with the point P serving as the center. A two-dimensional image of the object 3 may also be obtained by moving the bundle of rays in one direction with the scanning mirror 60 and by moving the scanning stage 61 in the direction perpendicular to the direction in which the laser beam is moved by the scanning mirror 60.

Two separate mirrors may be employed to move the laser beam in two directions. In that case, where P1 and P2 are the origins of the deflection of the individual scanning mirrors, an optical system (an afocal system) for providing a conjugate relation between P1 and P2 may be inserted between P1 and P2 so that P1 and P2 can be made conjugate to Q.

The positional relationship between the scanning mirror 60 and the light blocking plate 31 with respect to the condenser 2 and the objective 4 is not limited to that of the present embodiment. More specifically, in the structure in which an optical beam is moved along the surface of the object 3 by the scanning mirror 60, as in the case of this embodiment, the origin P of the deflection of the bundle of rays reflected by the scanning mirror 60 has to be conjugate to the central point Q of the light blocking plate 31 with respect to the condenser 2 and the objective 4. In this way, the zero diffracted rays of light coming from the first phase area of the phase plate 21 are always made incident upon the opening 31a of the light blocking plate 31.

Figure 7:
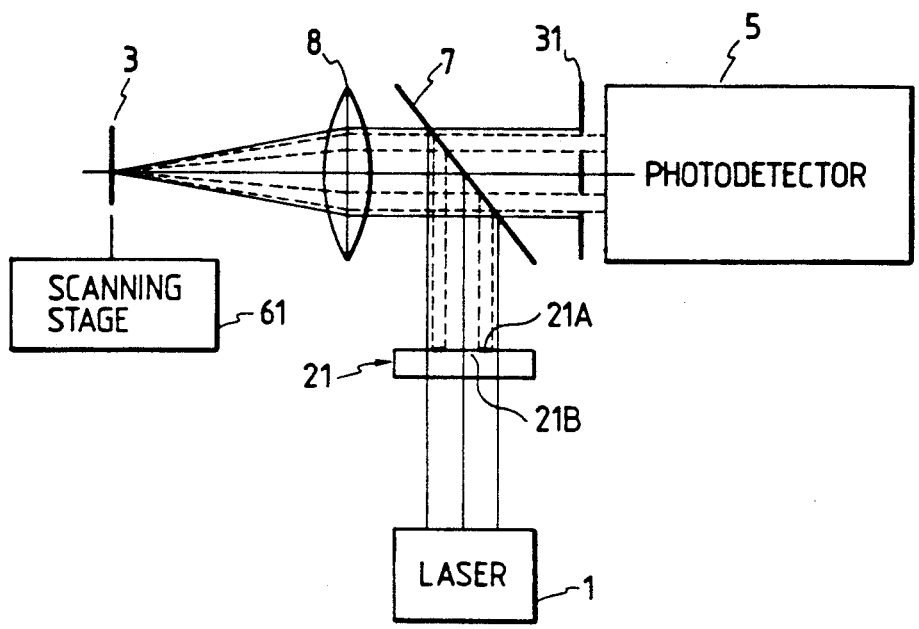
FIG. 7 is a schematic view of a third preferred embodiment of the present invention.

A third preferred embodiment of the present invention which exemplifies a reflected light microscope will be described below with reference to FIG. 7. In this embodiment, a semitransparent mirror 7 having the function of splitting an optical path is disposed between the phase plate 21 and a condenser/objective 8. The condenser/objective 8 condenses the bundle of rays on the object 3 and guides light coming from the object to the detector arrangement 31,5. Thus, the present embodiment can detect the fine phase pattern; on the object 3 as variation in the intensity of light. In this embodiment, the semitransparent mirror 7 may also be used as the phase plate 21 by providing the phase shift areas on the semitransparent mirror 7.

A fourth preferred embodiment of the present invention will be described below with reference to FIG. 8. In this embodiment, which is a reflected light microscope, a condenser lens 9 is disposed between the light blocking plate 31 and the photodetector 5 so as to condense the rays of light which pass through the light blocking plate 31 on the photodetector 5. In this way, the size of the surface at which the photodetector 5 receives light can be made small.

Figure 8:
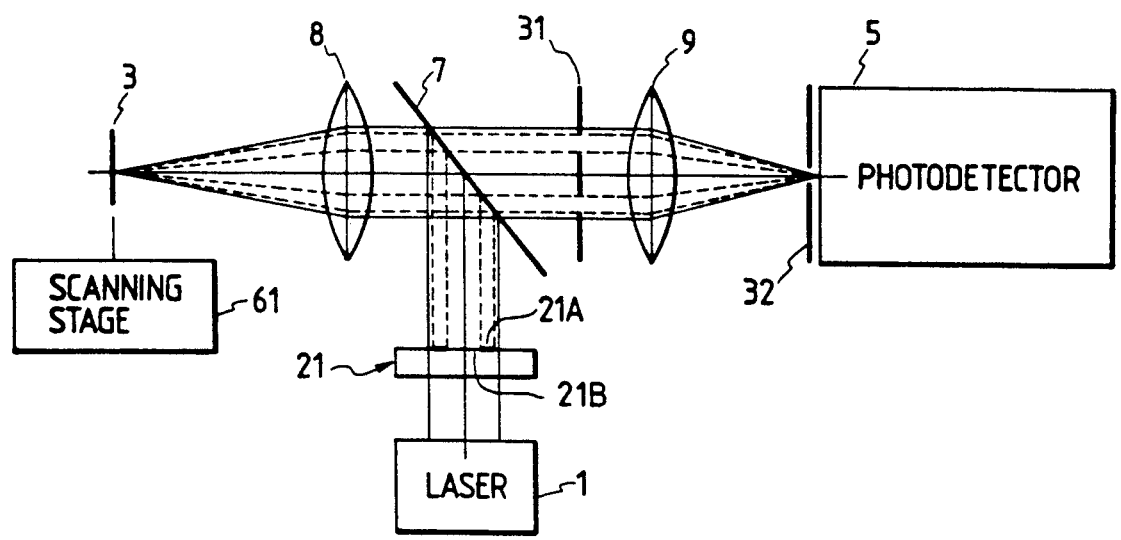
FIG. 8 is a schematic view of a fourth preferred embodiment of the present invention.

The structure shown in FIG. 8 by which the rays of light coming from the object are received through the condenser lens 9 can be applied to any of the previously discussed embodiments of the present invention. As is also shown in FIG. 8 by providing a fine aperture stop 32 in a conjugate relation with the object 3 to form a so-called confocal type scanning microscope, a signal can be detected only when the image of the object 3 is focused, and focusing information can be thereby provided. For example, by selecting the signal having the clearest contrast or the largest intensity among the signals obtained by moving the objective 8 to the individual positions on the optical axis as the best focused signal, the surface of the object which varies to a large extent can be observed. This confocal type microscope can be applied not only to the reflected light microscope but also to the transmitted light microscope.

Figure 9:
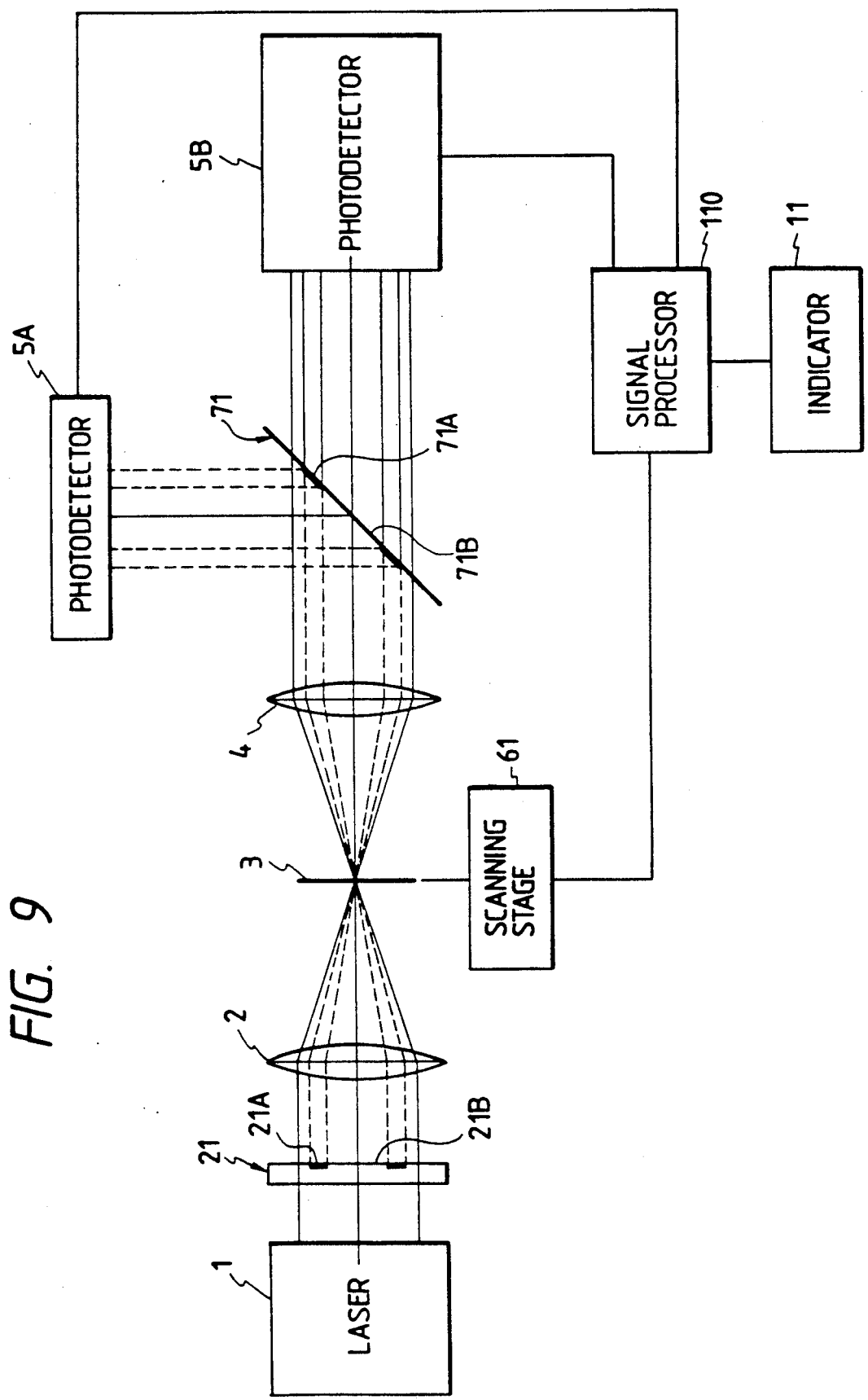
FIG. 9 is a schematic view of a fifth preferred embodiment of the present invention.

FIG. 9 shows a fifth preferred embodiment of the present invention in which the light of the first optical path area and the light of the second optical path area are separately and concurrently observed. In these two areas, the bright and dark visual fields are reversed, so measurement having a higher sensitivity can be performed by obtaining the difference between the two measured values. A light ray separating member 71 has a reflecting portion 71A for reflecting the rays of light of the first optical path area, and a transmitting portion 71B for transmitting the rays of light of the second optical path area.

The rays of light of the first optical path area are detected by a photodetector 5A, and the rays of light of the second optical path area are detected by a photodetector 5B. A signal processor 110 determines the difference between the signals detected by the photodetectors 5A and 5B and outputs the resulting output to the scanning stage 61 and to the indicator 11. In this way, a highly sensitive detection result can be obtained. This method of detecting the two areas separately can be applied not only to the transmitted light microscope but also to the reflected light microscope.

As will be apparent to those skilled in the art, the present invention offers significant advantages over a conventional phase contrast microscope. For example, in the conventional phase contrast microscope, the aperture disposed on the illumination side must be strictly conjugate to a phase plate disposed on the image forming side. In the present invention, however, the phase plate and the light blocking plate are not limited to such a strict positional relationship, so that there is much greater freedom of design. Furthermore, whereas the conventional phase contrast microscope requires various types of phase plates in order. to change the transmittance of the phase area according to the phase difference of the object, in the present invention the phase pattern on the object can be readily displayed in an optimal contrast state by appropriate processing in the signal processor

I claim:

1. A scanning type microscope, comprising:
   a coherent light source;
   condenser means for condensing rays of light supplied from said coherent light source on an object;
   a phase member disposed between said coherent light source and said condenser means, said phase member having first and second phase areas providing a predetermined phase difference on a wave front of rays of said light reaching said object;
   objective means for guiding rays of said light coming from said object;
   light separating means for separating rays of guided light coming from said objective means in a first optical path area corresponding to said first phase area of said phase member from rays of guided light coming from said objective means in a second optical path area corresponding to said second phase area of said phase member;
   photodetector means for receiving the separated rays of light in said first optical path area; and
   scanning means for relatively moving said object and a position at which the rays of light supplied from said coherent light source are condensed by said condenser means.

2. A scanning type microscope according to claim 1, wherein said light separating means includes a light blocking member which is disposed for blocking said rays of guided light in said second optical path area.

3. A scanning type microscope according to claim 1, wherein said scanning means has a stage member for moving said object in a direction perpendicular to an optical axis of said condenser means.

4. A scanning type microscope according to claim 2, wherein said scanning means has a tilt angle variable scanning mirror which is disposed between said phase member and said condenser means, with an origin of deflection of rays of said light reflected by said scanning mirror being substantially conjugate to said light blocking member with respect to said objective means and said condenser means.

5. A scanning type microscope according to claim 1, wherein said predetermined phase difference is substantially one quarter of a wavelength of said light.

6. A scanning type microscope, comprising;
   a coherent light source;
   condenser-objective means for condensing rays of light supplied from said coherent light source on an object and for guiding rays of said light coming from said object;
   a phase member disposed between said coherent light source and said condenser-objective means, said phase member having first and second phase areas providing a predetermined phase difference on a wave front of rays of said light reaching said object;
   light separating means for separating rays of guided light coming from said condenser-objective means in a first optical path area corresponding to said first phase area of said phase member from rays of guided light coming from said condenser-objective means in a second optical path area corresponding to said second phase area of said phase member;
   photodetector means for receiving the separated rays of light in said first optical path area; and
   scanning means for relatively moving said object and a position at which the rays of light supplied from said coherent light source are condensed on said object by said condenser-objective means.

7. A scanning type microscope according to claim 6, further including optical path splitting means disposed between said coherent light source and said condenser-objective means.

8. A scanning type microscope, comprising:
   means for radiating coherent light;
   means for condensing rays of said light on a predetermined plane on which an object is disposed;
   a phase member disposed between said radiating means and said condensing means, said phase member having first and second phase areas providing a predetermined phase difference on a wave front of rays of said light reaching said predetermined plane;
   first and second photodetector means for generating first and second detection outputs, respectively;
   means for directing rays of said light coming from said predetermined plane in a first optical path area corresponding to said first phase area toward said first photodetector means, and for directing rays of said light coming from said predetermined plane in a second optical path area corresponding to said second phase area toward said second photodetector means;
   processing means for producing from said first and second detection outputs an output corresponding to a difference between said first and second detection outputs; and scanning means for relatively moving said object and said rays of light condensed by said condensing means along said predetermined plane.

9. A scanning type microscope according to claim 8, further including means for displaying a phase pattern of said object represented by the output of said processing means.

10. A scanning type microscope according to claim 8, wherein said scanning means relatively moves said object and said condensed rays of light by said condensing means in response to the output of said processing means.

11. A scanning type microscope, comprising:
a coherent light source;
means for condensing rays of light from said light source on an object plane;
phase means disposed between said light source and said condensing means and including first and second phase areas for providing a predetermined phase difference on a wave front of rays of said light reaching said object plane;
means for guiding rays of said light coming from said object plane;
photodetector means;
means for providing rays of said light guided by said guiding means and in a first optical path area corresponding to said first phase area to said photodetector means substantially independently of rays of said light guided by said guiding means and in a second optical path area corresponding to said second phase area; and
scanning means for moving a position at which said condensing means condenses light from said light source on said object plane.

12. A scanning type microscope according to claim 11, wherein said phase means includes a phase plate having said first and second phase areas thereon.

13. A scanning type microscope according to claim 11, wherein said predetermined phase difference is substantially ¼ of a wavelength of said light.

14. A scanning type microscope according to claim 11, wherein said second phase area is larger than said first phase area.

15. A scanning type microscope according to claim 11, wherein said first phase area is annular and said second phase area is complementary thereto.

16. A scanning type microscope according to claim 11, wherein said providing means comprises a light blocking member configured and disposed to block said rays of light in said second optical path area and to pass said rays of light in said first optical path area.

17. A scanning type microscope according to claim 16, wherein said providing means further includes additional condensing means disposed between said light blocking member and said photodetector means for condensing said rays of light passed by said blocking member on said photodetector means.

18. A scanning type microscope according to claim 17, wherein said providing means further includes aperture stop means disposed between said additional condensing means and said photodetector means in conjugate relation to said object plane.

19. A scanning type microscope according to claim 17, wherein said scanning means includes a tilt angle variable scanning mirror disposed between said phase member and said condensing means, with an origin of deflection of rays of said light reflected by said scanning mirror being substantially conjugate to said light blocking member with respect to said condensing means and said guiding means.

20. A scanning type microscope according to claim 11, wherein said condensing means and said guiding means are common with one another.

21. A scanning type microscope according to claim 20, further comprising optical path splitting means disposed for directing rays of said light from said phase member to said condensing means and for transmitting rays of said light guided by said guiding means to said providing means.

22. A scanning type microscope according to claim 21, wherein said optical path splitting means includes a semi-transparent mirror.

23. A scanning type microscope according to claim 11, comprising additional photodetector means and wherein said providing means includes means for providing said rays of light in said second optical path area to said additional photodetector means independently of said rays of light in said first optical path area.

24. A scanning type microscope according to claim 23, further comprising processing means for producing an output according to a difference between respective outputs of said photodetector means and said additional photodetector means.

25. A scanning type microscope according to claim 23, wherein said providing means comprises a member having a light reflecting portion for reflecting said rays of light in one of said first and second optical path areas toward the photodetector means corresponding to that optical path area and a light transmitting portion for transmitting said rays of light in the other of said first and second optical path areas toward the other of said photodetector means.

* * * * *